(12) United States Patent
Tomescu et al.

(10) Patent No.: US 11,154,817 B2
(45) Date of Patent: *Oct. 26, 2021

(54) FORMED SHEET MEMBRANE ELEMENT AND FILTRATION SYSTEM

(71) Applicant: Fibracast Ltd., Hannon (CA)

(72) Inventors: Ionel John Tomescu, Ancaster (CA); Rafael Simon, Pacific Palisades, CA (US)

(73) Assignee: Fibracast Ltd., Hannon (CA)

(*) Notice: Subject to any disclaimer, the term of this patent is extended or adjusted under 35 U.S.C. 154(b) by 133 days.

This patent is subject to a terminal disclaimer.

(21) Appl. No.: 16/129,063

(22) Filed: Sep. 12, 2018

(65) Prior Publication Data

US 2019/0009216 A1 Jan. 10, 2019

Related U.S. Application Data

(63) Continuation of application No. 13/654,918, filed on Oct. 18, 2012, now Pat. No. 10,105,651.

(Continued)

(51) Int. Cl.
*B05D 1/26* (2006.01)
*B29C 53/24* (2006.01)
(Continued)

(52) U.S. Cl.
CPC .............. *B01D 61/18* (2013.01); *B01D 63/06* (2013.01); *B01D 63/081* (2013.01);
(Continued)

(58) Field of Classification Search
CPC ....... B29C 55/30; B29C 70/52; B29C 70/521; B29C 70/50
See application file for complete search history.

(56) References Cited

U.S. PATENT DOCUMENTS 2,576,864 A   11/1951   Valente
2,789,530 A * 4/1957   Fleischauer ............... B05C 1/02
                                                          118/248
(Continued)

FOREIGN PATENT DOCUMENTS

CN   1220616 A   6/1999
CN   2339604 Y   9/1999
(Continued)

OTHER PUBLICATIONS

Canadian Patent Application No. 3,018,461, Office Action dated Jul. 10, 2020.
(Continued)

*Primary Examiner* — Nathan H Empie
(74) *Attorney, Agent, or Firm* — Borden Ladner Gervais; Michael Damiani

(57) ABSTRACT

A piece of substrate material is formed under heat and pressure by a roller against a cavity or platen into a shaped substrate sheet having one or more depressions. Two substrate sheets are bonded together to form a substrate wherein the one or more depressions form one or more interior channels. The substrate is coated with a dope in a casting device having a guide portion corresponding to the shape of the substrate sheets and quenched to form a filtering membrane.

13 Claims, 17 Drawing Sheets

Related U.S. Application Data

(60) Provisional application No. 61/549,507, filed on Oct. 20, 2011.

(51) Int. Cl.

| | | |
|---|---|---|
| *B01D 61/18* | (2006.01) | |
| *B01D 67/00* | (2006.01) | |
| *B01D 69/06* | (2006.01) | |
| *B29C 65/48* | (2006.01) | |
| *B29C 65/00* | (2006.01) | |
| *B01D 63/06* | (2006.01) | |
| *B01D 63/08* | (2006.01) | |
| *C02F 1/44* | (2006.01) | |
| *B29L 31/00* | (2006.01) | |
| *B29L 31/60* | (2006.01) | |
| *B29C 65/08* | (2006.01) | |
| *B29C 65/16* | (2006.01) | |
| *B29C 65/52* | (2006.01) | |
| *B29L 31/14* | (2006.01) | |
| *B29C 65/06* | (2006.01) | |

(52) U.S. Cl.
CPC ......... *B01D 67/0013* (2013.01); *B01D 69/06* (2013.01); *B29C 53/24* (2013.01); *B29C 65/483* (2013.01); *B29C 65/4815* (2013.01); *B29C 66/112* (2013.01); *B29C 66/131* (2013.01); *B29C 66/1312* (2013.01); *B29C 66/543* (2013.01); *B29C 66/547* (2013.01); *B29C 66/5414* (2013.01); *B29C 66/63* (2013.01); *B01D 2315/06* (2013.01); *B01D 2323/42* (2013.01); *B29C 65/06* (2013.01); *B29C 65/08* (2013.01); *B29C 65/16* (2013.01); *B29C 65/168* (2013.01); *B29C 65/526* (2013.01); *B29C 66/21* (2013.01); *B29C 66/71* (2013.01); *B29C 66/7294* (2013.01); *B29C 66/934* (2013.01); *B29L 2031/14* (2013.01); *B29L 2031/601* (2013.01); *B29L 2031/755* (2013.01); *C02F 1/442* (2013.01); *C02F 1/444* (2013.01)

(56) References Cited

U.S. PATENT DOCUMENTS

| | | | |
|---|---|---|---|
| 3,401,798 A | 9/1968 | Nyrop | |
| 3,620,375 A | 11/1971 | Jack | |
| 3,725,985 A | 4/1973 | Yarber | |
| 3,734,659 A | 5/1973 | Harris | |
| 3,849,050 A | 11/1974 | Rutherfoord et al. | |
| 3,887,320 A | 6/1975 | Erlewine et al. | |
| 4,155,792 A | 5/1979 | Gelhaar et al. | |
| 4,258,093 A | 3/1981 | Benedyk | |
| 4,327,130 A * | 4/1982 | Pipkin ..................... B05C 3/18 118/106 |
| 4,451,370 A | 5/1984 | Murai et al. | |
| 4,510,010 A | 4/1985 | Schramm et al. | |
| 4,555,342 A | 11/1985 | Grant | |
| 4,589,983 A | 5/1986 | Wydevan | |
| 4,636,309 A | 1/1987 | Bellhouse | |
| 4,756,835 A | 7/1988 | Wilson | |
| 5,002,666 A | 3/1991 | Matsumoto et al. | |
| 5,240,540 A | 8/1993 | Matsumoto et al. | |
| 5,296,065 A | 3/1994 | Greatorex | |
| 5,482,625 A | 1/1996 | Shimizu et al. | |
| 5,651,888 A | 7/1997 | Shimizu et al. | |
| 5,772,831 A | 6/1998 | Moro et al. | |
| 5,788,862 A | 8/1998 | Degen et al. | |
| 5,882,407 A | 3/1999 | Takeno et al. | |
| 5,975,706 A | 11/1999 | Nakayama | |
| 6,010,560 A | 1/2000 | Witzko et al. | |
| 6,110,249 A | 8/2000 | Medcalf et al. | |
| 6,224,706 B1 | 5/2001 | Matich | |
| 6,273,938 B1 | 8/2001 | Fanselow et al. | |
| 6,280,824 B1 | 8/2001 | Insley et al. | |
| 6,287,467 B1 | 9/2001 | Nagano et al. | |
| 6,376,012 B1 * | 4/2002 | Innes ..................... B05C 5/0254 118/122 |
| 6,544,590 B1 | 4/2003 | Kodera et al. | |
| 6,773,590 B2 | 8/2004 | Prutkin | |
| 6,843,908 B2 | 1/2005 | Okajima et al. | |
| 7,083,729 B2 | 8/2006 | Vellinga | |
| 7,380,774 B2 | 6/2008 | Akita et al. | |
| 9,492,792 B2 | 11/2016 | Tomescu et al. | |
| 10,105,651 B2 * | 10/2018 | Tomescu ................. B29C 53/24 |
| 2002/0121339 A1 | 9/2002 | Ikeda et al. | |
| 2002/0172802 A1 | 11/2002 | Weder | |
| 2004/0112213 A1 | 6/2004 | Dominiak et al. | |
| 2005/0115891 A1 | 6/2005 | Vellinga et al. | |
| 2006/0163150 A1 | 7/2006 | Golden et al. | |
| 2007/0039296 A1 | 2/2007 | Schrage et al. | |
| 2007/0251940 A1 | 11/2007 | Hennessey | |
| 2008/0134912 A1 | 6/2008 | Golan | |
| 2008/0156730 A1 | 7/2008 | Heinen | |
| 2009/0223187 A1 | 9/2009 | Nelson et al. | |
| 2010/0218471 A1 | 9/2010 | Smithies et al. | |
| 2011/0171377 A1 | 7/2011 | Mues et al. | |

FOREIGN PATENT DOCUMENTS

| | | |
|---|---|---|
| CN | 1450930 A | 10/2003 |
| CN | 1496286 A | 5/2004 |
| CN | 1575196 A | 2/2005 |
| CN | 1623636 A | 6/2005 |
| CN | 1890016 A | 1/2007 |
| CN | 101306277 A | 11/2008 |
| CN | 102046302 A | 5/2011 |
| DE | 8907667 U1 | 3/1990 |
| DE | 19639964 A1 | 4/1998 |
| EP | 0439352 A2 | 7/1991 |
| EP | 0692293 A1 | 1/1996 |
| EP | 2223725 A1 | 9/2010 |
| JP | S54130646 A | 10/1979 |
| JP | H0418923 A | 1/1992 |
| JP | H0768693 A | 3/1995 |
| JP | H07256174 A | 10/1995 |
| JP | 2001111203 A | 4/2001 |
| JP | 2003528711 A | 9/2003 |
| JP | 2008012799 A | 1/2008 |
| WO | 8605413 A1 | 9/1986 |
| WO | 9517242 A1 | 6/1995 |
| WO | 9636757 A2 | 11/1996 |
| WO | 9947335 A1 | 9/1999 |
| WO | 0170375 A1 | 9/2001 |
| WO | 2007036332 A2 | 4/2007 |
| WO | 2009135529 A1 | 11/2009 |
| WO | 2009147086 A1 | 12/2009 |
| WO | 2011043228 A1 | 4/2011 |
| WO | 2011130853 A1 | 10/2011 |

OTHER PUBLICATIONS

Chinese Patent Application No. 201710881355.X, Office Action dated Sep. 15, 2020—English Translation not available.
English Translation of Chinese Patent Application No. 201710881355.X, Office Action dated Sep. 23, 2020.
Korean Patent Application No. KR1020207014234, Office Action dated Aug. 19, 2020—English Translation Not Available.
U.S. Appl. No. 16/654,659, Restriction Requirement dated Oct. 30, 2020.
Canadian Patent Application No. 2,852,773, Office Action dated Mar. 6, 2020.
Canadian Patent Application No. 2,796,531, Office Action dated Sep. 27, 2017.
Canadian Patent Application No. 2,852,773, Office Action dated Oct. 12, 2018.
Chinese Patent Application No. 201180024419.5, Supplemental Observations dated Oct. 18, 2018—English Translation Available.

(56) References Cited

OTHER PUBLICATIONS

Chinese Patent Application No. 201180024419.5, Invalidation Petition dated Sep. 21, 2018—English Translation Available.
Chinese Patent Application No. 201280062722.9, Fourth OA dated Mar. 6, 2017.
Chinese Patent Application No. 201280062722.9, Office Action dated Aug. 6, 2015—With Translation.
Chinese Patent Application No. 201280062722.9, Office Action dated Mar. 30, 2016—With Translation.
Chinese Patent Application No. 201280062722.9, Office Action dated Sep. 19, 2016—With Translation.
Chinese Patent Application No. CN201180024419.5, Examination Decision on Request for Invalidation dated Mar. 14, 2019.
Dainippon Plastics Co Ltd, English Language Abstract of JP07256174 published Oct. 9, 1995.
Doyen et al., "Spacer-Fabric Supported Membranes: A Superior Type of Submerged Flat Sheet MBR Technology," ACHEMA Conference, May 15, 2009, 2 pages.
English Translation of Chinese Patent Application No. 201710881355.X, Office Action dated Apr. 13, 2020.
European Patent Application No. 12841184.0, Office Action dated Dec. 10, 2019.
European Patent Application No. 11771458.4, Office Action dated Jun. 8, 2018.
European Patent Application No. 11771458, Supplementary European Search Report dated Dec. 17, 2013.
European Patent Application No. 11771458.4, Communication pursuant to Article 94(3) EPC dated Oct. 30, 2017.
European Patent Application No. 117714584, Office Action dated Apr. 12, 2017.
European Patent Application No. 12841184, Supplementary European Search Report dated Aug. 4, 2015.
European Patent Application No. 12841184.0, Partial European Search Report dated May 15, 2015.
European Patent Application No. EP11771458.4, Communication pursuant to Article 94(3) EPC dated Aug. 7, 2019.
Gore W L & Ass Gmbh, English Language abstract of DE19639964 published Apr. 2, 1998.
International Patent Application No. PCT/CA2011/050201, International Preliminary Report on Patentability dated Nov. 1, 2012.
International Patent Application No. PCT/CA2011/050201, International Search Report and Written Opinion dated Jul. 20, 2011.
International Patent Application No. PCT/CA2012/050742, International Preliminary Report on Patentability dated May 1, 2014.
International Patent Application No. PCT/CA2012/050742, International Search Report and Written Opinion dated Jan. 17, 2013.
Korean Patent Application No. 10-2014-7013562, Office Action dated Aug. 20, 2018—English Translation Available.
Korean Patent Application No. 10-2014-7013562, Office Action dated Feb. 28, 2019—English Translation Available.
Korean Patent Application No. 10-2018-7023892, Office Action dated Nov. 1, 2018—English Translation Available.
Korean Patent Application No. KR10-2012-7030408, Office Action dated Feb. 21, 2018—English Translation Available.
Korean Patent Application No. KR10-2012-7030408, Office Action dated Oct. 31, 2017—English Translation available.
Korean Patent Application No. KR1020197014735, Office Action dated Jun. 17, 2019—English Translation Available.
Matsushita Electric Works Ltd, English Language Abstract of JPS54-130646 published Oct. 11, 1979.
Microdyn-Nadir GmbH, The Art to Clear Solutions, publication date unknown.
Nielsen et al., "Mechanical Properties of Polymers and Composites," CRC Press, 2nd Edition, 1994, pp. 337.
Nippon Mektron KK, English Language Abstract of JP2001111203 published Apr. 20, 2001.
U.S. Appl. No. 13/654,918, Notice of Allowance dated Sep. 26, 2018.
U.S. Appl. No. 15/294,601, Non-Final Office Action dated Feb. 25, 2019.
U.S. Appl. No. 15/294,601, Restriction Requirement dated Oct. 18, 2018.
U.S. Appl. No. 13/654,918, Notice of Allowance dated Jun. 14, 2018.
U.S. Appl. No. 13/654,918, Non-Final Office Action dated Oct. 6, 2017.
U.S. Appl. No. 15/294,601, Notice of allowance dated Oct. 16, 2019.
U.S. Appl. No. 15/294,601, Notice of allowance dated Feb. 25, 2019.
Canadian Patent Application No. 3,018,461, Notice of Allowance dated Feb. 16, 2021.
Canadian Patent Application No. 2,852,773, Office Action dated Jan. 29, 2021.
Chinese Patent Application No. 201710881355.X, Office Action dated Dec. 15, 2020—English Translation available.
Chinese Patent Application No. 201710881355.X, Office Action dated Mar. 23, 2021—English Translation available.
European Patent Application No. 11//1458.4, Communication pursuant to Article 94(3) EPC dated Mar. 11, 2021.
U.S. Appl. No. 16/654,659, Non-Final Office Action dated Apr. 12, 2021.
Canadian Patent Application No. 2,852,773, Office Action dated Aug. 12, 2021.

* cited by examiner

FORMED SHEET MEMBRANE ELEMENT AND FILTRATION SYSTEM

This application is a continuation of U.S. application Ser. No. 13/654,918, filed Oct. 18, 2012, which is a non-provisional application of U.S. Application Ser. No. 61/549,507, filed Oct. 20, 2011. U.S. Application Ser. No. 61/549,507 and Ser. No. 13/654,918 are incorporated by reference.

FIELD

This specification relates to devices for membrane separation and methods of making them, and in particular to microfiltration (MF), ultrafiltration (UF) or nanofiltration (NF) membrane elements or modules suitable for immersed, alternatively called submerged, operation.

BACKGROUND

The following is not an admission that anything discussed below is common general knowledge or citable as prior art.

Immersed MF or UF membranes may be made in a flat sheet, alternatively called plate and frame, configuration. In this configuration, a roll of membrane sheet is made by casting a polymeric separation layer cast onto a roll of non-woven substrate. Two generally rectangular pieces of membrane sheet are attached at their edges, for example by supersonic welding, onto opposing sides of hollow plastic frame. This creates a panel with a hollow interior channel to collect filtered water, alternatively called permeate. Several panels slide side by side into a frame that can be immersed in water to be filtered. The insides of the panels are connected to the suction side of a pump to draw permeate through the membrane sheets. Bubbles provided from below the frame cause a mixed flow of bubbles and liquid to rise through vertical slots between the panels to held clean the membrane surfaces. Examples of this type of device are shown in U.S. Pat. Nos. 5,482,625; 5,651,888; 5,772,831; 6,287,467; and, 6,843,908, all owned by Kubota Corporation.

Flat sheet membrane modules are generally robust and have a low manufacturing cost (relative to hollow fiber membranes) because they can be cast in a wide sheet. However, flat sheet membranes have poor packing densities (membrane surface area per unit volume of the module) relative to hollow fiber membranes and so the total cost of a large flat sheet plant can be very high. Further, typical flat sheet membrane panels cannot be backwashed vigorously enough to clean the membranes mechanically.

A variation of a flat sheet membrane element is shown in International Publication Number WO 2007/036332 to Microdyn-Nadir GMBH. In these elements, two layers of membrane material are cast onto the front and back sides of a fabric having a porous central area between two dense layers. The central area provides a permeate channel also connects the two dense layers together allowing the element to be backwashed for mechanical cleaning. These elements do not require a four-sided frame and they are about 2 mm thick, which is thinner than the plate and frame elements described above. However, these elements are also flexible and they are spaced apart by about 10 mm center to center in a frame. The packing density is better than for the plate and frame elements described above, but still much lower than a hollow fiber membrane module. The central area of the fabric, although porous, also provides a resistance against flow in the permeate channel and increases the cost of the element.

INTRODUCTION

The following introduction is intended to introduce the reader to the detailed description to follow and not to limit or define any claimed invention.

A piece of substrate material, for example a non-woven fabric, is formed under heat and pressure, for example against the inner surface of a mold cavity, into a shaped substrate sheet having one or more depressions, for example a series of generally parallel depressions, relative to a plane. Two substrate sheets, at least one of which has depressions, are bonded together, for example along or beside the edges of the depressions. Optionally, an additional intermediate sheet may be bonded between the two substrate sheets. The two substrate sheets form a substrate having a plurality of interior channels in combination with each other or the intermediate sheet, if there is one. If the pieces of substrate material were not previously coated with a membrane material, the substrate is coated with a dope and quenched or coagulated to form a membrane sheet.

The membrane sheet is generally planar, but with one or more ridges corresponding to the interior channels providing a surface area larger than an equivalent flat plate area. The interior channels provide open passages for permeate to flow to the edges of the sheet. A membrane sheet is preferably bonded together along one or more lines between interior channels as well as along outer edges parallel to the depressions. When bonded together between a sufficient number of interior channels, optionally on each side of each interior channel, the membrane sheet can be used without a four-sided frame and can be mechanically cleaned by backwashing.

A plurality of membrane sheets may be placed side by side in a bundle. Permeating edges of the membrane sheets, which intersect with and are open to one or more of the interior channels, may be separated from the edges of adjacent membrane sheets in the bundle by spacers. The bundle is connected to one or more headers to produce a module. The connection to a header may be permanent or removable. A plurality of modules can be assembled into a cassette. The cassette may hold the modules in a tank of water to be filtered such that the membranes are generally vertical and the interior channels are generally horizontal. Permeate flows to the headers, which are at the sides of the cassette. The liquid being filtered, and optionally gas bubbles, flows vertically through spaces between the membranes.

DRAWINGS

FIG. 19 is an exploded cross sectional view of another mold in the form of a roll forming machine.

DETAILED DESCRIPTION

Figure 1:
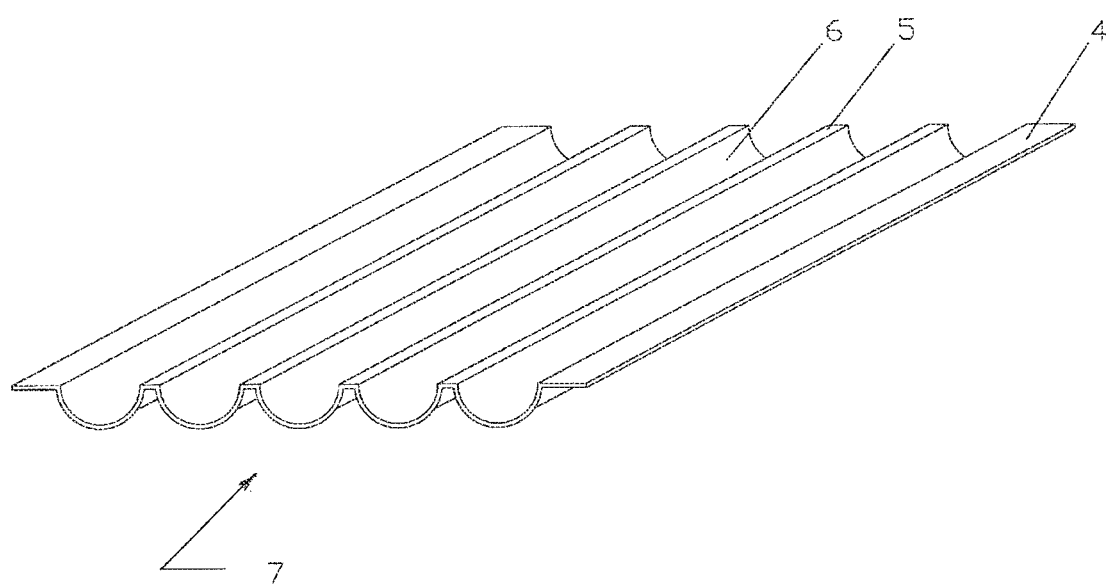
FIG. 1 is an isometric view of a formed substrate sheet.

In this specification, a "sheet" or "substrate sheet" typically refers to a piece of a substrate material, which may be shaped to have a plurality of depressions. A "permeate sheet" or a "substrate" typically refers to two sheets bonded together. A "permeate channel" typically refers to a channel on the inside of a substrate defined by the inside surfaces of the sheets, through which liquid can flow parallel to the plane of the substrate to the edge of the substrate. A "connector" may refer to a portion of a sheet between two adjacent depressions, or a portion of a permeate sheet between two adjacent permeate channels. An "insert" may refer to a part of a mold that is placed between a top and bottom die of the mold and used to shape some or all of the inside surface of a depression or a permeate channel. A "membrane sheet" may refer to a permeate sheet that has a separation layer coated on it.

In an example of a sheet and a method of making it, to be described in more detail below, a sheet is made from a piece of a non-woven material that is heat treated and pressed into a cavity to form a shape having a plurality of depressions, alternatively called ripples. In the example described herein, the depressions are separated by connectors. The connectors contact or lie in a common plane. In the example described herein, the connectors are essentially flat and the depressions are essentially semi-cylindrical. Two of these sheets are attached together at one or more, preferably all, of their connectors and at their two outer edges, alternatively called flanges, that are parallel to the depressions. This forms a permeate sheet that has an array of parallel generally cylindrical permeate channels, each channel formed by two of the semi-cylindrical ripples, one from each of the sheets. The permeate sheet has two open edges perpendicular to the channels, where the permeate channels discharge. The permeate sheet may be trimmed if necessary to a final size and shape. If the sheet was not pre-coated with a membrane material, the permeate sheet is fed into a coater where a membrane dope is cast on the outer surfaces of the permeate sheet. The coated permeate sheet then passes into a quench or coagulation bath wherein the dope is transformed into a solid membrane material having a separation layer. The membrane material may be formed by a phase separation process, for example a TIPS or NIPS process. The resulting membrane sheet is removed from the quench bath and further rinsed and impregnated (if needed) and dried. A plurality, for example between 2 and 50 membranes sheets may be attached together at their open ends according to a target inter-sheet spacing to form a bundle. At least one open end of the bundle is attached, permanently or with a removable seal, to a permeating header to form a module. The module may be integrity tested, for example by a pressure decay test. Modules are assembled into a cassette comprising structural elements to make the cassette suitable to insertion into a filtration tank. The membrane sheets are oriented generally vertically in the tank, with the channels oriented generally horizontally, and the headers located at the sides of the cassette and oriented generally vertically. The cassette preferably also has a lower aeration grid configured to discharge bubbles into spaces between the membrane sheets. The Figures, to be discussed in detail below, show an example of a sheet, a mold for making the sheet, a module and a cassette.

Referring to FIG. 1, a sheet 7 is made of a piece of a non-woven textile. The sheet 7 that has been pressed into a shape having a series of parallel semi-cylindrical depressions 6 spaced at predetermined intervals and separated by flat connectors 5. The outer depressions are bordered by two edge flanges 4. The radius of the semi-cylindrical depressions 6 may be, for example, between 0.3 mm and 50 mm depending on the application.

Figure 2:
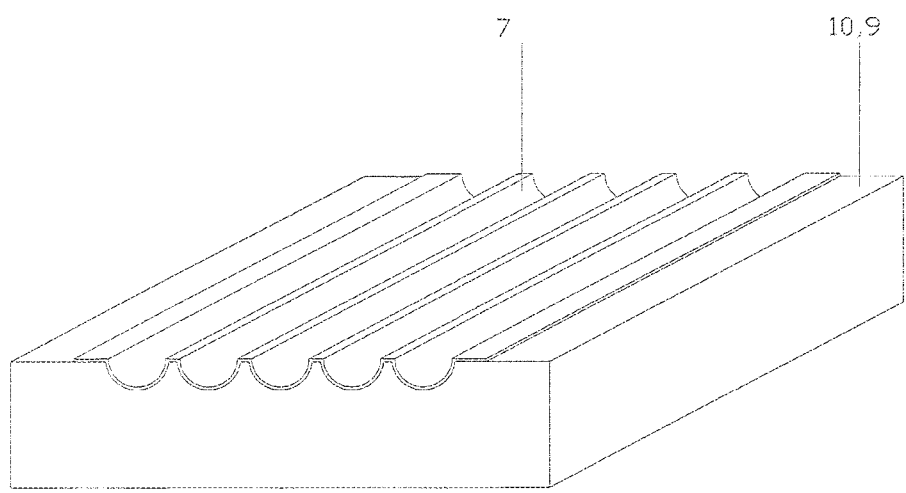
FIG. 2 is an isometric view of a substrate sheet as in FIG. 1 on the bottom cavity of a mold.
Figure 3:
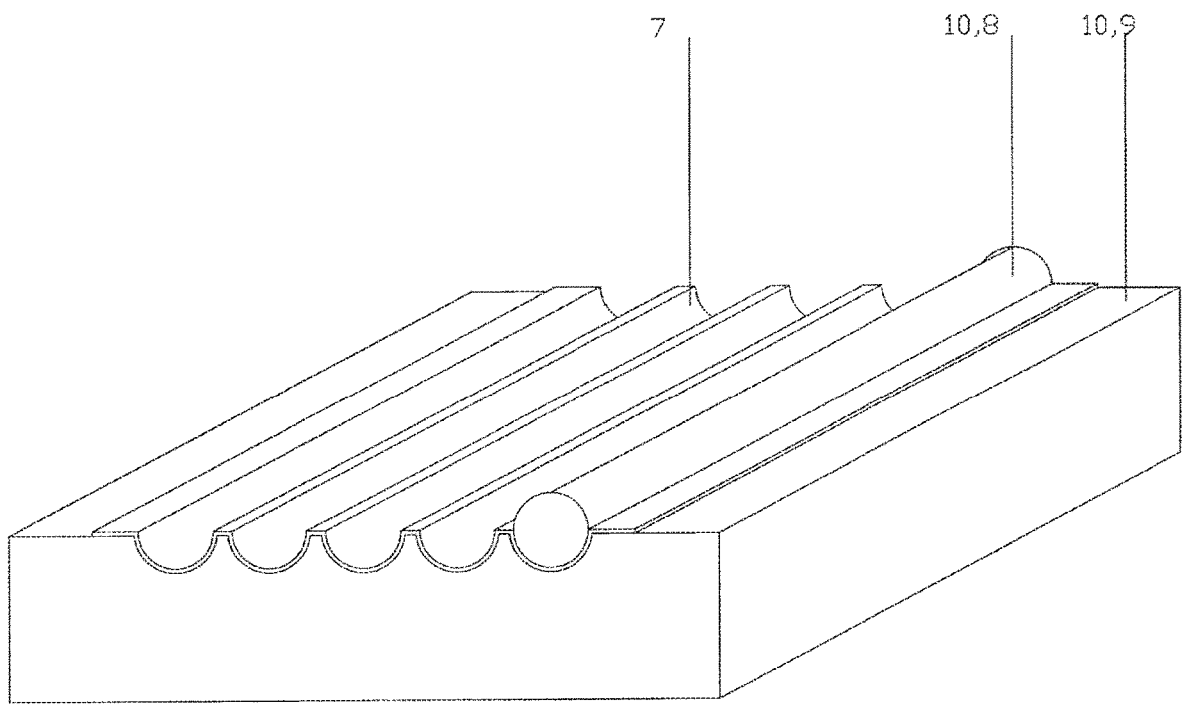
FIG. 3 is an isometric view of a substrate sheet on the bottom cavity of a mold as in FIG. 2 with a mold insert on the substrate sheet.
Figure 4:
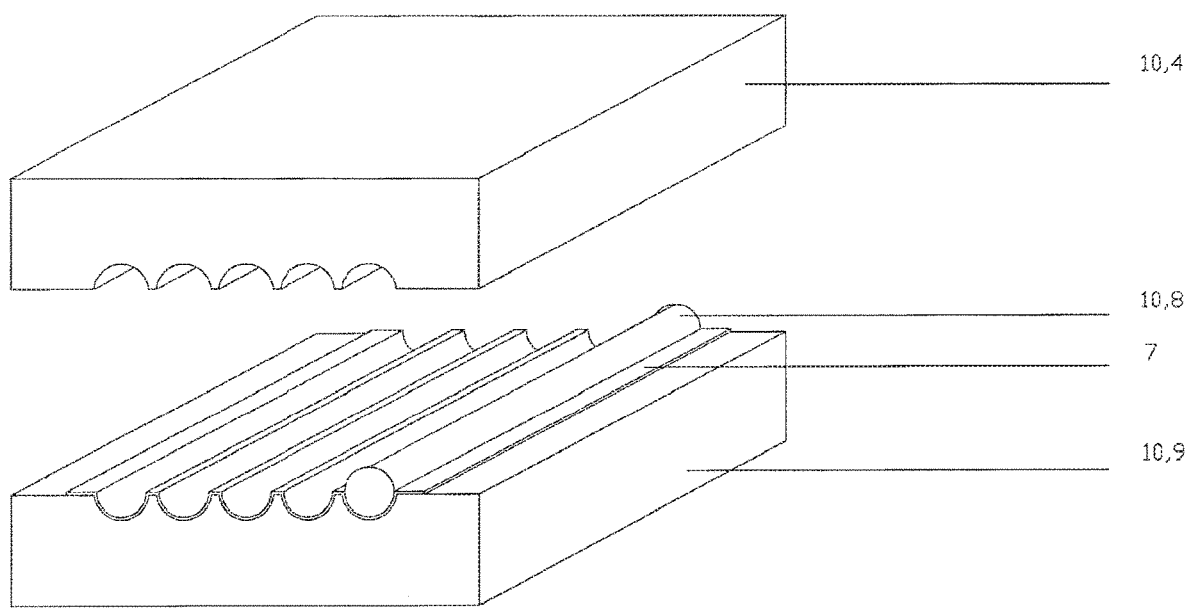
FIG. 4 is an isometric view of a substrate sheet on the bottom cavity of a mold with a mold insert on the substrate sheet as in FIG. 3 with an upper cavity of the mold.

Referring to FIGS. 2 to 4, a mold 10 comprising a bottom cavity 9, a top cavity 11, and a plurality of inserts 8 (only one shown) is used for the forming process. The bottom cavity 9 matches the outer shape of the final molded sheet 7. The inserts 8, may be metallic and are used in conjunction with the cavities 9, 11 to form the semi-cylindrical depressions 6. The inserts 8 can be separate components of the mold 10 or built into the top cavity 11 of the mold 10. When the mold has built in inserts 8, they can be fixed or have the capability of freely rotating. Rotating or detached inserts 8 allows for sliding of the non-woven substrate material during a mold closing step. Highly polished (mirror finish) materials are used for the two cavities 9, 11 of the mold and the inserts 8. A piece of initially flat non-woven substrate is loaded onto the bottom cavity 9 of the mold (FIG. 2). This piece is initially cut to pre-determined dimensions. After loading the piece of substrate, the inserts 8 are placed on the piece of substrate (if they are not built into the top cavity 11) and the top cavity 11 is placed over the inserts 8. The mold 10 is then closed and pressure is applied between the cavities 9, 11, for example by clamping them together. The top cavity 11 and inserts 8 thereby press the sheet 7 into the bottom cavity 9.

The top cavity 11 of the prototype mold 10 has the same interior shape as the bottom cavity 9. The mold 10 shown in FIGS. 2 to 4 is capable of molding 2 sheets at the same time by inserting another piece of substrate between the inserts 8 and the top cavity 11 before closing the mold 10. Each mold cavity is preferably well machined within tight tolerances to provide good control over the thickness and the shape of the final sheet 7. In particular, over compaction of any part of the sheet 7 is undesirable. Heat is applied during the molding process. After the heating phase, the mold is cooled in a closed position until the sheet (or sheets) is capable of maintaining its shape. In this way, a sheet 7 is initially heated and then cooled both while being pressed against the inside surface of a cavity 9. The sheet 7 is preferably heated to its heat deflection temperature (HDT) or more while it is pressed against the inner surface of the cavity 9. The sheet 7 is also preferably cooled to below its HDT, and more preferably below its glass transition temperature (Tg), while it is pressed against the inner surface of the cavity 9. The sheet 7 thereby takes on a permanent shape having an outer surface corresponding to the inner surface of the cavity.

A non-woven fabric, for example a polyester based fabric normally used as a substrate for flat sheet UF membranes, may be used for the substrate material. Samples from different suppliers were tested using a prototype mold, including a sample from Hirose (05TH-80W), 3 grades from 3M Powell, and multiple grades from Crane Nonwovens, AWA Paper, and Ahlstrom. The substrate materials had thicknesses ranging from 80 to 120 microns, and air permeability of 5 to 15 cc per square centimeter per second. Substrate materials were dried prior to molding. The substrate materials generally have a matrix of thermally bonded short fibers and longer reinforcing fibers. All of the samples tested produced acceptable sheets 7.

Depending on the composition of the substrate, the molding temperature is at least 100 F (38 degrees Celcius) and varied in tests between 300 and 500 F (149 and 260 degrees Celcius). In comparison, the Tg of polyester is about 60 to 75 degrees Celcius, the HDT of polyester is about 170 to 177 degrees Celcius and the melting point (Tm) of polyester may be about 255 degrees Celcius, all of these temperatures being subject to variation depending on the form of the polyester. The temperature is preferably above the HDT of the matrix fibers and the reinforcing fibers, and optionally also above the melting point of the matrix fibers, but preferably below the melting point of the reinforcing fibers. The mold is heated for long enough for the substrate to assume a shape corresponding to the inner surface of the cavity 9, 11, but at a combination of time and temperature that maintains a substantial portion of the air permeability of the substrate such that a membrane dope may still penetrate and anchor to the substrate. Heat was provided by placing the mold 10 in a temperature-controlled oven. Cycle time varied between 5 and 10 minutes for heating and over 30 minutes for cooling. For production, a mold with built-in water (or other cooling agent) lines (similar to injection molding) can be expected to significantly shorten the cooling process. The mold components 9, 8, 11 are sized to produce a desired final sheet 7 thickness, for example between 0.05 to 0.1 mm. The formed sheet 7 was 0.075 mm thick when made in a first prototype mold. Some compaction is acceptable, and possibly preferable, to reduce wall thickness and increase the ability of the sheet 7 to hold a molded shape. The mold closing and holding pressures were in the range of 15 to 20 psi. A mold for a very large sheet 7 may require a higher closing pressure but can use the same holding pressure. Two sheets 7 were molded simultaneously in the first prototype mold using removable cylindrical metal inserts 8. The molded sheets 7 maintained an inner and outer radius matching the inserts 8 and cavities 9, 11 used in the mold. The radius of the inner surfaces of the depressions in the cavities 9, 11 in the prototype mold 10 was about 1.5 mm. In a second prototype mold, the radius of the inner surfaces of the depressions in the cavities was about 0.6 mm. An optimal diameter for microfiltration or ultrafiltration of water may be closer to 0.7 mm in order to maximize packing density with acceptable lumen pressure drop.

Figure 5:
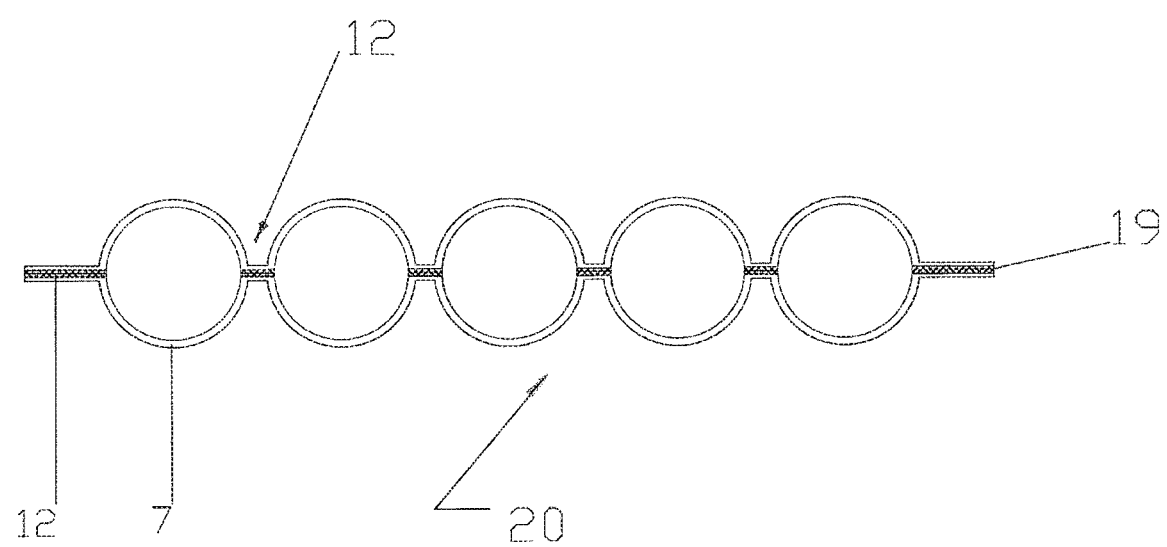
FIG. 5 is a cross section of a substrate made of two formed substrate sheets as in FIG. 1.
Figure 6:
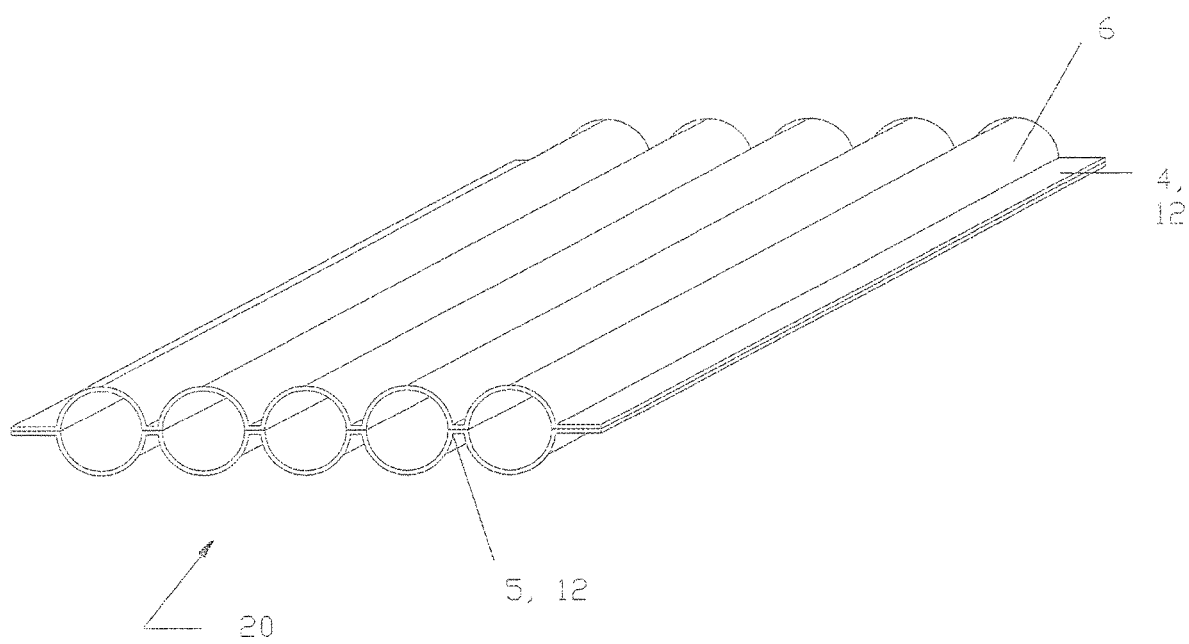
FIG. 6 is an isometric view of the substrate of FIG. 5.

Referring to FIGS. 5 and 6, after molding the sheets 7 are trimmed to final dimensions and a pair of sheets 7 are assembled into a permeate sheet 20. The sheets 7 are attached together at bonding areas 12. Sheets 7 made in the prototype mold as described above were bonded together using several types of adhesives including epoxy, water-based adhesives, and polyurethanes. The same mold 10 that was used to form the sheets 7 was used for fusing together two sheets 7. In order to eliminate sticking of the bonding areas 12 to the mold 10, and contamination of the surface that will subsequently be coated with a membrane, due to full penetration of the bonding agent through the substrate material, higher viscosity adhesives are preferred. Two sheets 7 made in the first prototype mold as described above, when fused together, created a permeate sheet 20 with cylindrical channels having a 3 mm outer diameter and a spacing between the outside diameters of about 2 mm. The overall dimension of the permeate sheet 20 were about 10 inches (25 cm) by 1½ inches (37 cm), although larger sheets 7 may be made. Two sheets 7 made in the second prototype mold created a permeate sheet 20 with cylindrical channels having a 1.2 mm outer diameter and a spacing between the outside diameters of about 1 mm. These sheets 20 were about 125 mm by 120 mm. The formed permeate sheets 20 from both prototype molds were self-supporting and maintained their shape with crisp transitions between the depressions 6 and the connectors 5.

In general, two sheets 7 can be attached together using thermoset materials like polyurethanes, epoxies or silicones or by using hot melts (thermoplastics) or other adhesives 19. The gluing process can take place in a separate gluing mold similar to the mold 10 used to form the sheets 7. First, the bottom sheet is loaded in the mold. The glue is applied using a dispenser, for example a roller or a glue printing head moved by servos controlled by a computer. Next, cylindrical inserts may be placed inside the previously molded semi-circular shapes. The outside diameter of these inserts will match the intended ID of the newly formed channels. Using the inserts is optional, but the inserts help ensure a good roundness of the permeate channels. However, the assembly process was also done in the prototype forming mold 10 without the use of its inserts 8. In this case, the process steps related to loading and removing of the inserts are obviously eliminated. A bottom sheet 7 is loaded into a bottom cavity of the mold and a top sheet 7 is loaded in a top cavity of the mold 10. After closing the mold, the two sheets will touch each other only in the bonding area. With the mold closed pressure and heat may be applied to the newly created structure if required for the adhesive used. The contact surface will be glued together forming a permeate sheet 20. Once the cycle is complete the mold is opened and the inserts are removed. The permeate sheet 20 will be removed from the gluing mold, trimmed to final dimensions if necessary and transferred to a casting machine. The sheets 7 can comprise low surface energy fibers, for example of polyethylene terephthalate (PET), which may make it difficult to achieve a strong bond. Particularly strong bonds are provided even in PET based sheets 7 by using methyl methacrylate adhesive systems (MMA), epoxies and polyurethane (PUR) hot melt adhesives.

Another option for bonding is to use thermoplastic (hot melt) wires. The wires are positioned on top of the bottom sheet centered in the bonding areas 12. The other sheet 7, loaded in the other side of the mold, will be placed on top of the first sheet. Pressure and temperature is applied until the wires melt, penetrate superficially the two sheets 7 and fuses them together. As described before the process can be done with or without the use of inserts.

A third assembly method that can be used is sonic, friction or laser welding. Continuity of the bond along the connector is not paramount for the process since permeate flowing from one channel to another does not create contamination. Laser welding with a black PTFE backing plate behind the bonding areas 12, or with a near infrared absorbing welding material such as Clearweld™ system sold by Gentex Corporation between the sheets 7, provides a particularly strong bond.

For increased permeate sheet active surface and structural strength of the permeate sheet 20 a different assembly method can be used. A thin porous material may be placed between the two sheets prior to the assembly process. This permeate carrier media will allow the liquid permeating through the membrane in the connectors 6 area to flow between the two sheets 7 in the binding area 12 into the permeate channels and into the permeate headers. Welding or an adhesive can secure the two sheets together (via the porous material) and give structural strength to the permeate sheet 20 during the backwashing process. However, such a porous material is merely optional. It is not necessary for permeate to flow between one permeate channel and another, and some permeate may flow from the connector area into a permeate channel even in the absence of a porous material. Optionally, particularly if the membrane sheet will not be backwashed but possibly even if it will be backwashed, a welded or adhesive attachment between sheets 7 or between sheets 7 and an intermediate material may be discontinuous, for example in the form of a series of adhesive dots along the connectors 5, to allow the area of the connectors 5 to pass more permeate.

For additional strength, a permeate sheet 20 may optionally have a rigid insert sandwiched between the two sheets 7 on the edges 4 or on one or more of the connector areas 5, or both. The reinforcement is added during the assembly process previously described. The rigid inserts are made of very thin, high tensile strength materials, preferable plastic materials with or without reinforcement. They will compensate for stresses generated by weight increase during field operations when the permeate sheet is installed with the permeate channels in a horizontal position. The orientation of the sheets in a module will be determined by the type of application, hydraulic calculations and the type of process used for fouling protection and cleaning protocols. Additional reinforcements can be placed in the center of the permeate sheet 20 or in other locations throughout the permeate sheet 20.

Figure 15:
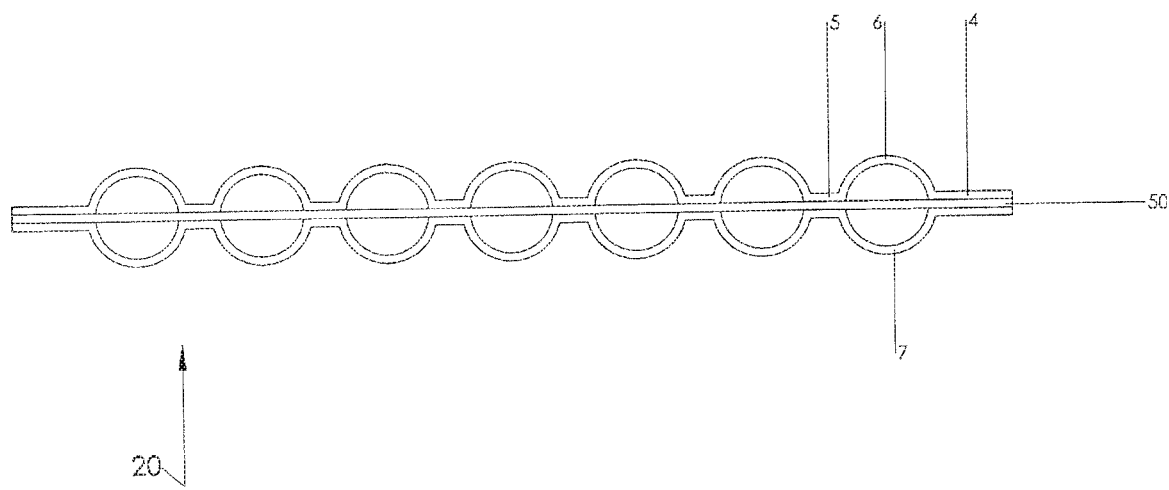
FIG. 15 is a side view of a permeate sheet having an intermediate flat sheet between two substrate sheets.
Figure 16:
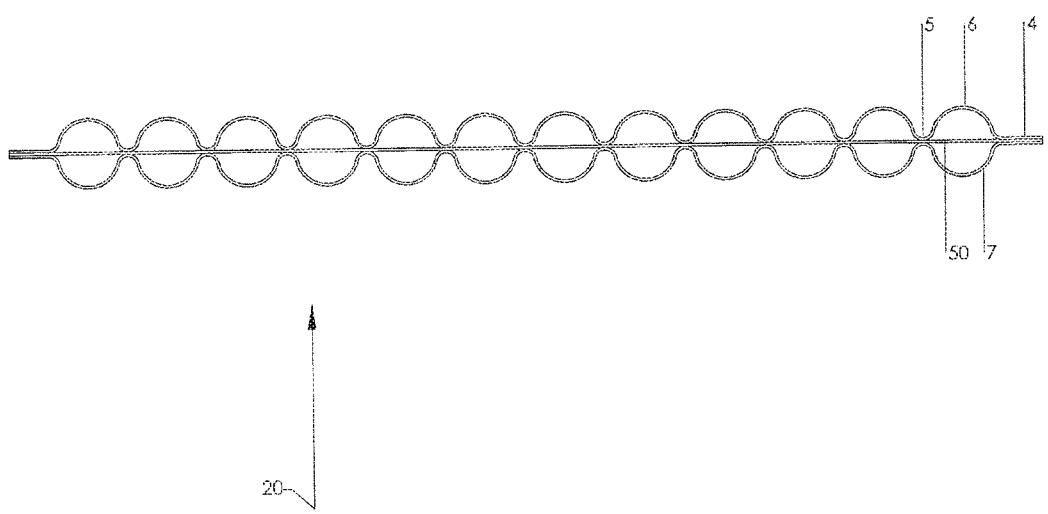
FIG. 16 is a side view of a permeate sheet made with substrates having an undulating profile.

As shown in FIG. 15, another option is to provide an intermediate material or insert by way of a sheet form insert 50 between the entire area of two sheets 7, thus creating two semi-cylindrical permeate channels for every one cylindrical permeate channel that would be formed without the insert 50. This insert 50 may be rigid to reinforce the sheets 7 as described above, or may be permeable to increase the activity of the connector 5 area of the sheets 7 as described above. The insert 50 may also be used, whether rigid or not and whether porous or not, to enable attaching the sheets 7 together. An adhesive or weld enhancing material may be applied, for example sprayed in a thin layer or printed as lines or a grid of dots, on both sides of the insert 50. Placing the insert 50 between two sheets 7 thus provides an alternate method for applying an adhesive or weld enhancing material to the connectors 5. Whether or not an adhesive is pre-applied, the insert 50 may also help provide a secure bond between sheets 7 if there is not a crisp distinction between the depressions 6 and the connectors 5, for example if the sheets 7 have an undulating shape as shown in FIG. 16. The insert 50 may be, for example, a solid film, for example of mylar, or a non-woven sheet such as a three dimensional matrix of polyamide (PA, nylon) fibers.

Figure 7:
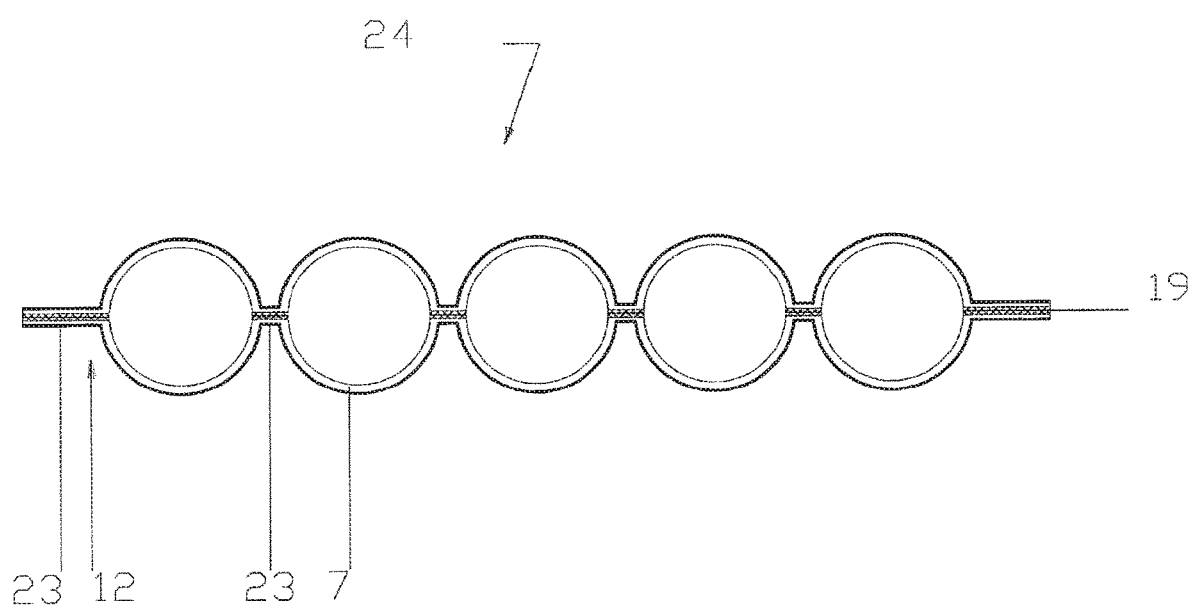
FIG. 7 is a cross-section of a membrane having a semi-permeable coating on a substrate as in FIG. 5.

After the permeate sheet 20 is formed, a polymeric membrane dope is cast on both faces. This can be done simultaneously for both sides or sequenced (one side at a time). The permeate sheet 20 is passed through a casting device that applies the dope. The casting device has a die, analogous to the spinneret of a hollow fiber coating device, with a shape corresponding to the outer shape of the permeate sheet 20. The dope is brought to the casting device when the permeate sheet 20 is present using gas pressure or a metering gear pump. The speed and the thickness of dope layer applied is controlled. Other process parameters like dope viscosity, temperature, and internal pressures inside the casting device are also controlled. The casting device has a shape matching the outside shape of the permeate sheet 20. The permeate sheet 20 is fed to the casting device vertically or horizontally, however vertical feeding reduces the tendency of dope to flow towards the binding areas 12. The exit of the casting device leads to a gap to allow the dispersion of the dope on to the permeate sheet 20 at a generally constant thickness. Subsequently the coated permeate sheet 20 passes through coagulation and rinse baths. This process will form a solid membrane layer 23 on top of the permeate sheet 20 by way of a phase inversion membrane formation process as shown in FIG. 7 to produce a membrane sheet 24. Membrane sheets 24 are then rinsed, impregnated (UF only) and dried in an offline process. Membrane sheets 20 made in the first prototype mold were coated with polysulfone in a layer of about 140 microns thick. The polysulfone impregnated the permeate sheet 20 but did fill the interior permeate channels of the membrane sheet 24.

Alternately, a membrane sheet 24 can also be made by forming a membrane on a substrate sheet before making a sheet 7. A flat sheet membrane can be cast on a regular casting machine. The flat sheet membrane is then formed in the mold 10 into a molded membrane sheet and assembled together with another such sheet into a membrane sheet 24. The molding process will have a different cycle time and use different process parameters.

Figure 8:
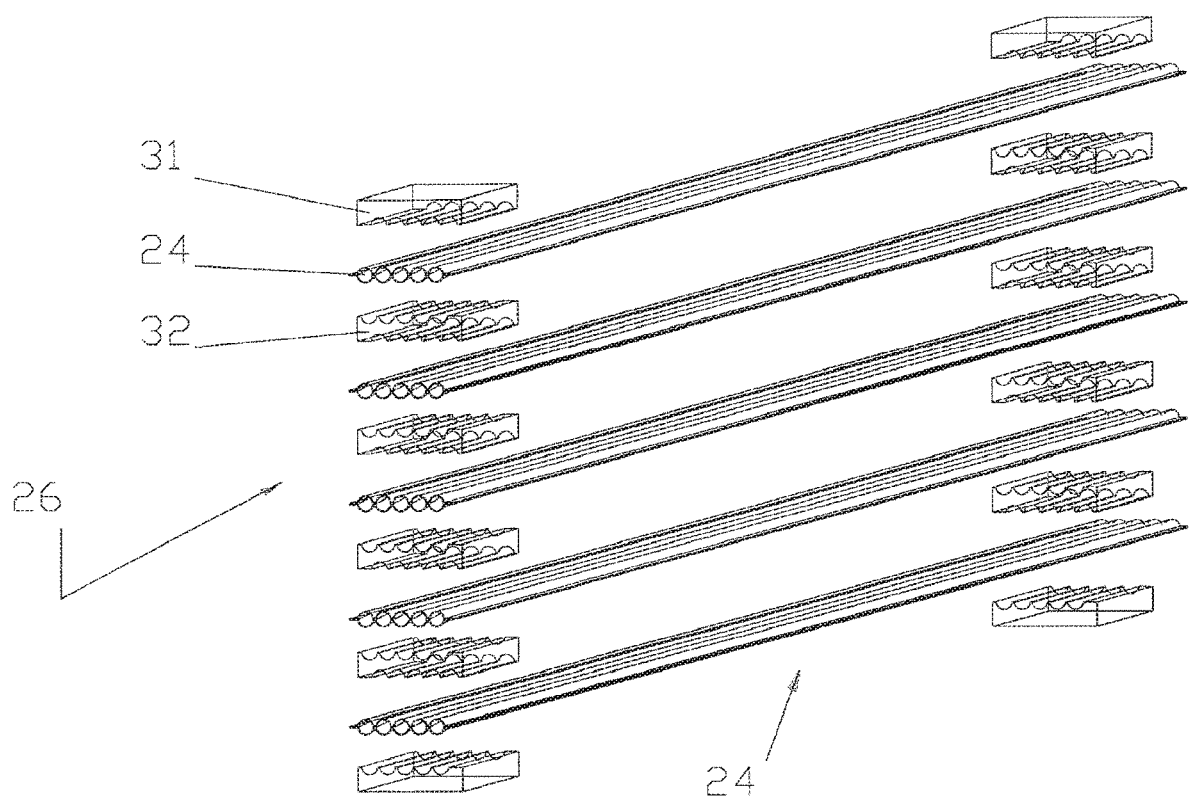
FIG. 8 is an exploded isometric view of a plurality of membranes as in FIG. 7 being assembled into a bundle.
Figure 9:
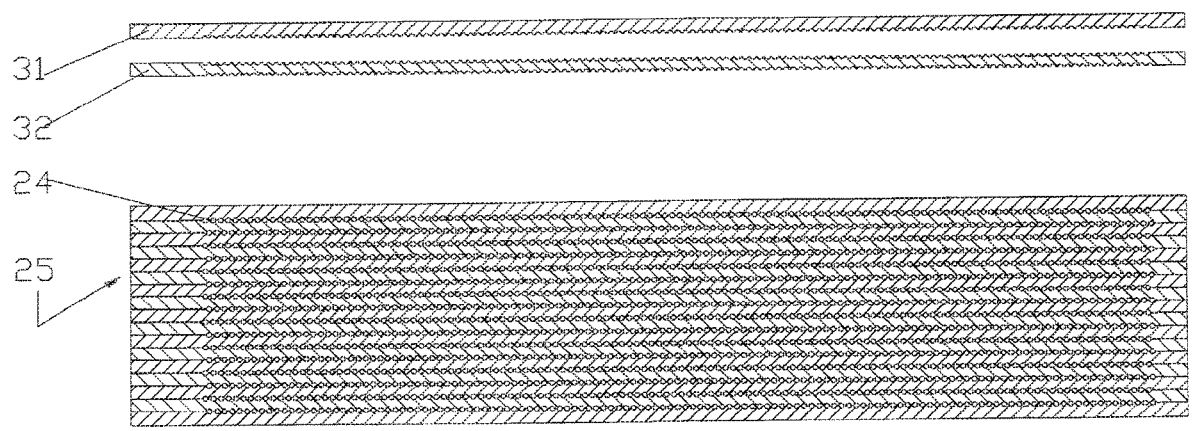
FIG. 9 is an end view of a membrane bundle.
Figure 10:
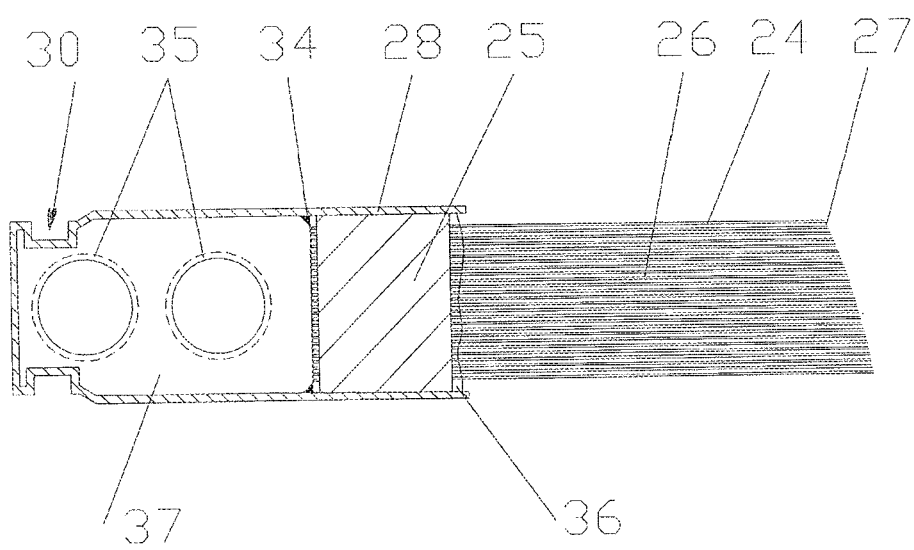
FIG. 10 is a cross section of a membrane bundle potted at one end into a permeate header.

Referring to FIGS. 8, 9 and 10 several membrane sheets 24 can be combined to form a bundle 26. While any number of membrane sheets 24 can be used, a preferred range is 15-50 based on desired inter-sheet spacing gaps and limits on plastic header molding. A bundle 26 can be potted in a plastic header molding 28 using a resin such as polyurethane according to conventional methods such as fugitive static potting or centrifuge potting with cutting to open the channel ends. An alternate potting method, as shown in FIGS. 8, 9 and 10 is to use plastic inserts 31, 32 to attach the membrane sheets 24 together into a potting block or brick 25 that can then be inserted into a seat in a header molding 28. Optionally, a plurality of membrane sheets 24 may be laid in series between two inserts 31, 32. For example, inserts 31, 32 that are about 1 m long may hold 4 membrane sheets 24, each of which is about 25 mm high. Further optionally, a porous divider 34 may define a bottom of the seat. The block 25 is potted into place by pouring a resin 36 into the header seat over the block 25. Permeate flows through the channels, exits the block 25 through open ends of the channels, flows through the divider 34 if any, and into a permeate receptacle 37 in the header 28. Permeate can be removed from the permeate receptacle 37 through a permeate spigot 25.

Figure 11:
FIG. 11 is a top view of membrane module having a membrane bundle potted into permeate headers at both ends.
Figure 12:
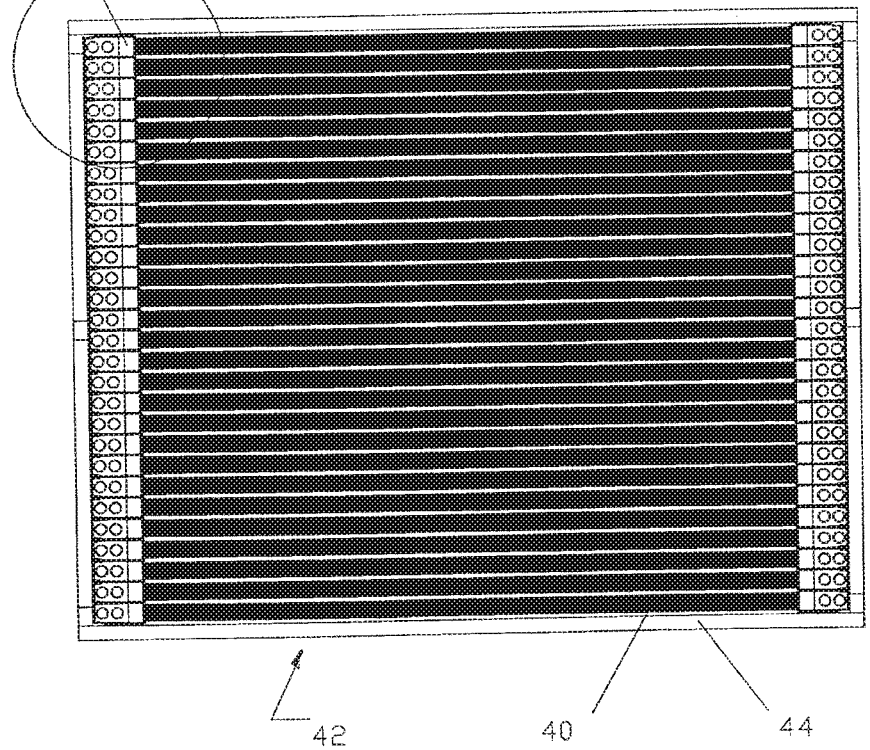
FIG. 12 is a top view of a cassette having a plurality of the modules of FIG. 11.
Figure 13:
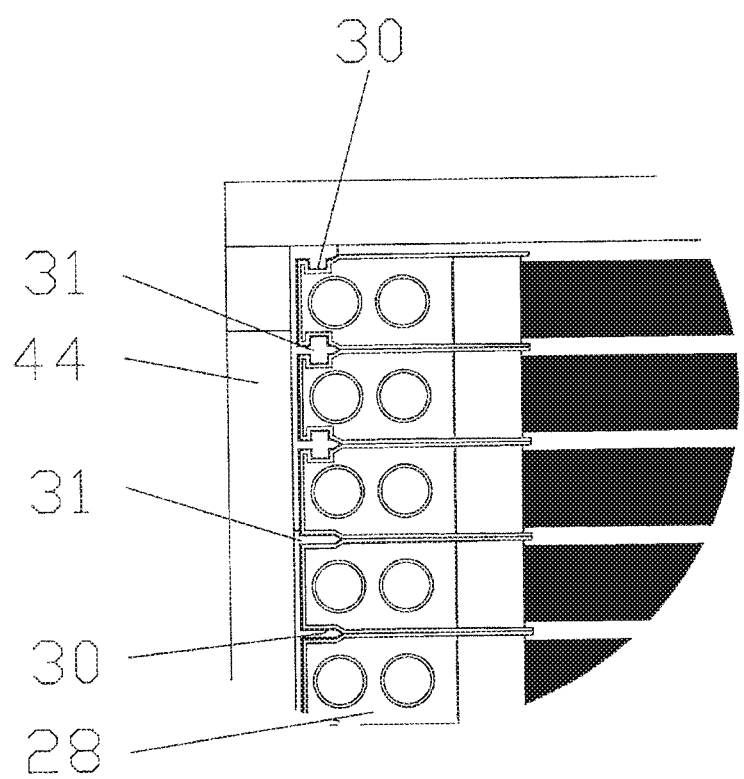
FIG. 13 is an enlarged view of a corner of the cassette of FIG. 12.
Figure 14:
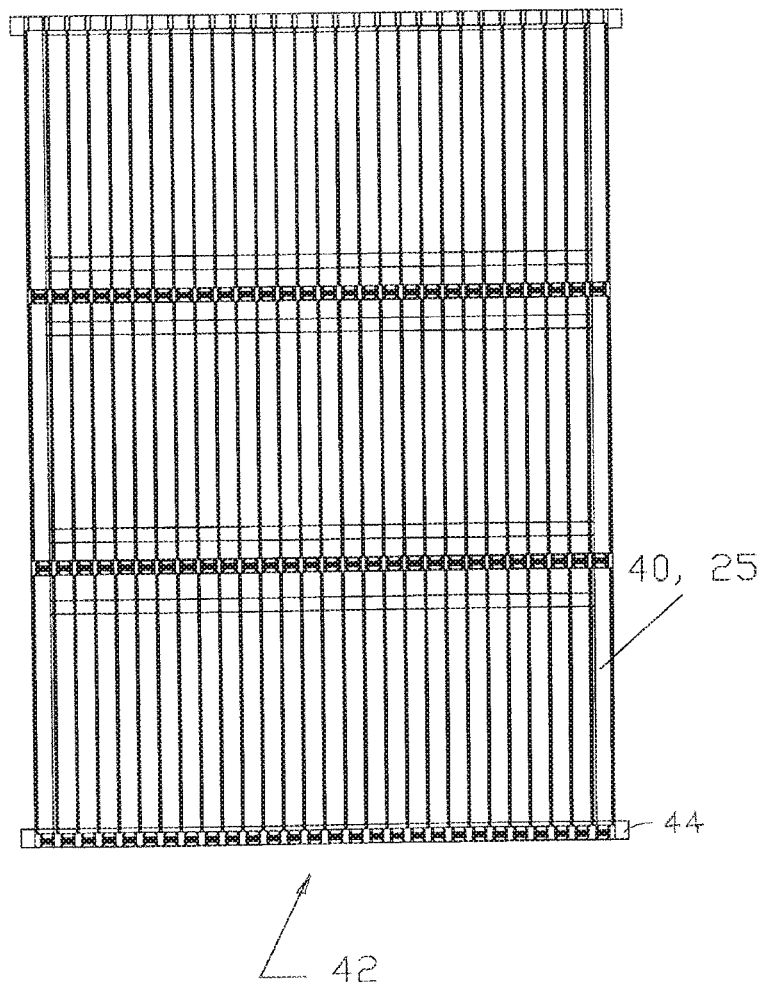
FIG. 14 is a side view of the cassette of FIG. 12.

FIG. 11 shows a module 40. The black area between the two permeate headers 40 represents a bundle 26 of membrane sheets 24 spaced by gaps 27 as shown in more detail in FIG. 10. The membrane sheets may be separated by a center to center distance of, for example, between 0.5 cm and 5 cm. Optionally, the membrane sheets 24 may be staggered relative to each other, with the ripples of one located across from the connectors of another. FIG. 12 shows a top view of a cassette 42 having several modules 40 contained within a frame 44. A permeate header (not shown) is connected to the permeate spigots 35 of the modules 40. The frame 44, headers 28 and, optional permeate pipes if any, are located at the sides of the cassette 42 so that fluids can travel upwards through the gaps 27. Modules 40 can be stacked with the permeate spigot 25 of one module 40 plugging into the permeate receptacle 37 of an upper or lower module 40. In FIG. 14, for example, three modules 40 are stacked together in a vertical column. Referring to FIG. 13, the frame 44 of the cassette 42 holds sliders 31 that correspond in shape and size to the alignment grooves 30 of the headers 28 to assist in placing the modules 40 in position in the cassette 42.

Another option is to not use a molded plastic header but to use the block as a finished element, potentially with a plastic guide attached to its perimeter, for direct insertion into a permeate cavity of a header or the cassette. A removable seal between the block and the permeate cavity is made by compressing the block into the permeate cavity, or by a sealing means such as an O-ring. Advantages of this method include less active fiber blocked by urethane, less manufacturing scrap from potting, increased cassette packing density, reduced raw material cost (header plastic and urethane), easy repair of channels in the field by pinning open channel ends after releasing them from the permeate cavity, and reduced replacement module costs.

Under the no-header design, fiber bundle blocks will be directly inserted into a cassette composed of a steel frame with molded plastic ends that serve both as headers with double o-rings and permeate collection channels. 1 meter high elements could be stacked in any number in order to fill up any size tank. Bundles would be tapered by having an increasingly thin layer of thermoplastic at the end where there are minimal stresses and channels are non-permeating to allow for an easier fit into headers and to allow for bundles to be spaced together more closely. The thermoplastic would be thicker near the top to allow for a restrainer bar to be placed across all modules for security. The system will be adjustable in case of shrinkage.

By providing molded permeate channels inside a permeate sheet 20, the distribution of active surface inside the filtration tank can be precisely controlled. Further, the precision molded permeate channels allow for a membrane wall thickness of 0.3 mm or less, or 0.15 mm or less, which is less than for a reinforced hollow fiber membrane. The outer diameter of the permeate channels may be 1 mm or less, or 0.5 mm or less. In a calculated example, the channels have an outside diameter of 0.7 mm, and a membrane wall thickness of 0.15 mm. The permeate channels would have an internal diameter of 0.4 mm, which would be sufficient for high volume permeate flow without significant pressure drop to permeate flow through the permeate channels in a membrane sheet that is 1 m wide.

The membrane sheet has a significantly increased surface area relative to a typical flat sheet membrane, avoids the frame components and spacers that are necessary in typical flat sheet modules, and the rigidity of the membrane sheets 24 allows for a larger area (referring to the external dimensions of the sheet rather than its membrane surface area) per sheet. The membrane sheets 24 may undulate or vibrate when aerated, but there is little or no abrasion between adjacent membranes as in hollow fiber systems. All permeate channels are precision placed within a sheet and sheets can be precision placed with respect to each other, allowing a packing density of up to 50%. Tank and module packing density are at least comparable to hollow fiber systems.

Vertically oriented sheets, with headers at the sides of the sheets, allow for an aeration grid to channel air between sheets with no top or bottom header to block flow. Because air is directed between each sheet and forced to travel upward, the issue of fouling in dead zones within hollow fiber bundles is removed. However, unlike typical flat sheet membranes, having only two headers allows some vibration of the membrane sheets to help prevent sludging that may occur at the membrane surface. Yet the well-defined vertical gaps between membranes fosters plug-flow through the gaps, which reduces average solids exposure and creates well defined paths for solids drainage during tanks drains.

While hollow fiber membranes are limited to polymers that can be extruded with the right flexibility, strength, and casting properties, flat sheet casting allows for more rigid, pH resistance polymers such as polysulfone to be used without suffering disadvantages due to polysulfone rigidity. The permeate sheets may also be coated with thin-film composites such as NF membrane materials, which allows for an immersed NF filter and bioreactor. New nanostructured membrane materials, for example using carbon nanotubes, aquaporins, masked etching, or other novel processes, may also be suitable for being formed on a permeate sheet.

Figure 17:
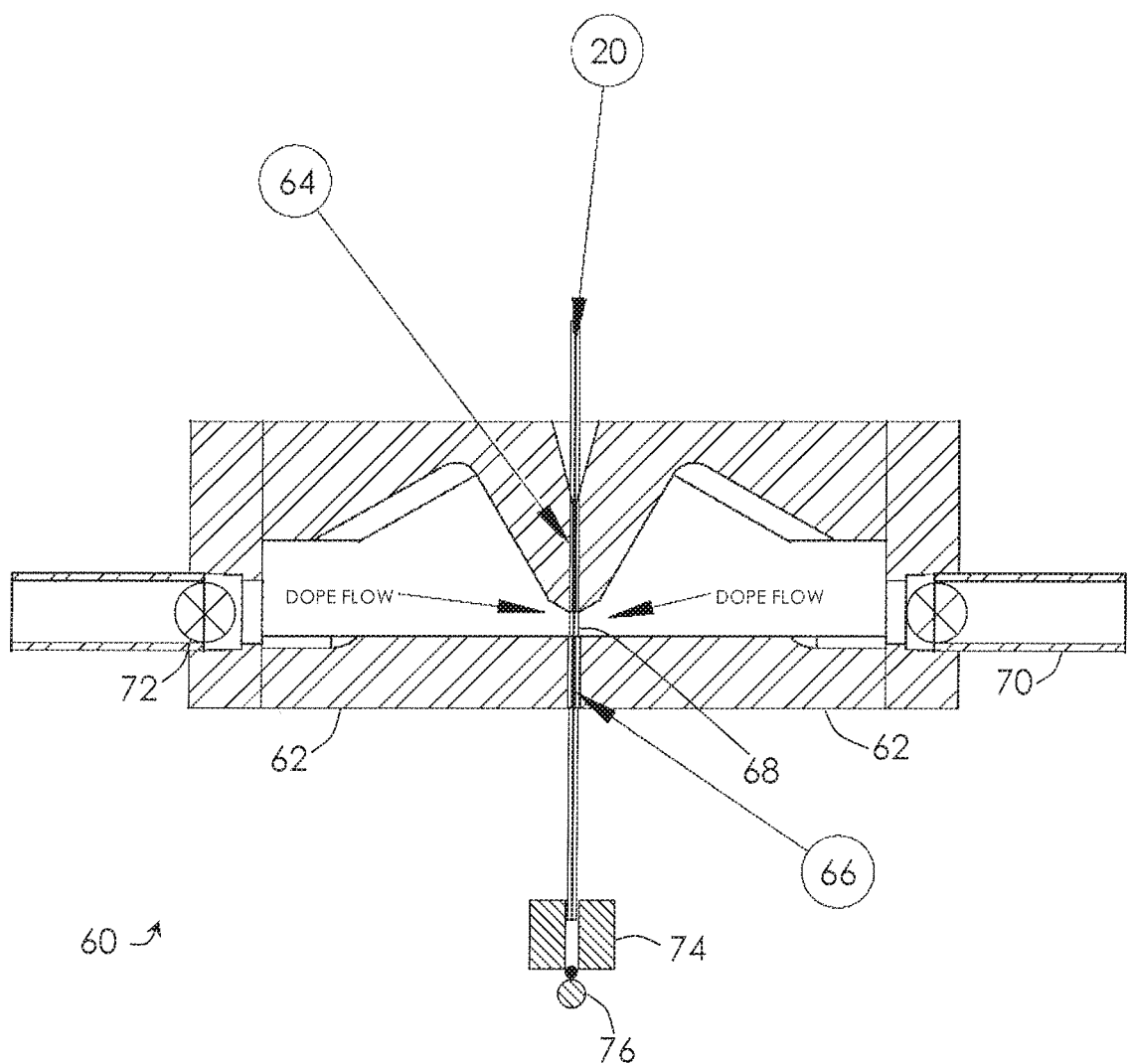
FIG. 17 shows a cross section of a coating device.
Figure 18:
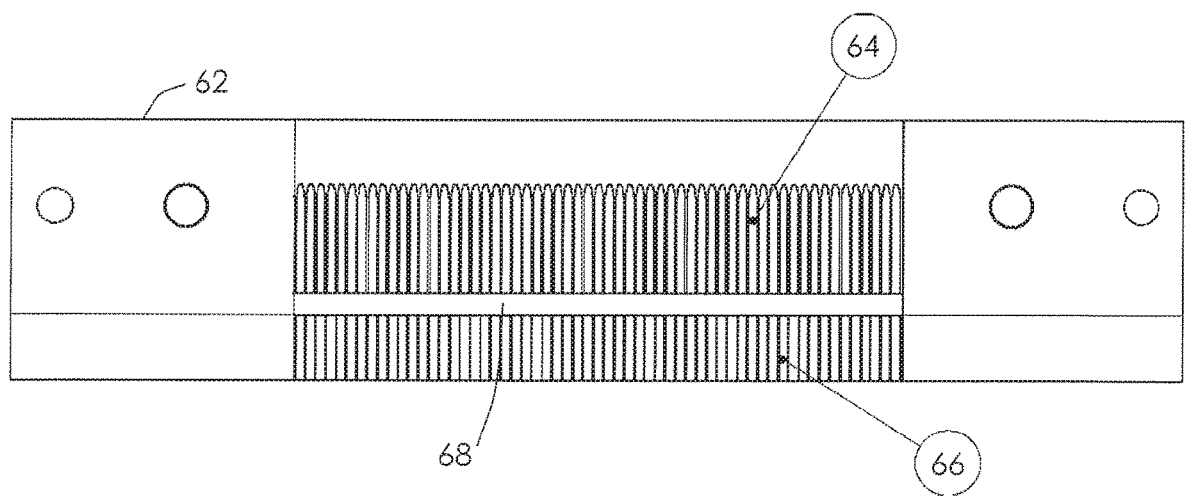
FIG. 18 shows an elevation view of the inside face of one half of the coating device of FIG. 17.

Referring to FIGS. 17 and 18, a coating machine consists of three main parts; a pumping system, a casting device 60 for dope application, and a quenching or coagulation bath for curing. The purpose of the coating machine is to apply an even layer of dope onto a permeate sheet 20 and to convert the dope into a semi-porous membrane layer.

The pumping system (not shown) takes pre-mixed dope held at a fixed temperature and delivers it to one or more inlets 70 on the casting device 60 via a metering system. This is a demand system, with the pump only turned on while a permeate sheet 20 is being coated.

The casting device 60 guides the permeate sheet 20 as it passes through a vertical slot in the casting device 60 and applies the dope to both sides of the permeate sheet 20 at the same time. The casting device 60 has two body halves 62. Each body half 62 has a guide portion 64 with a pattern corresponding to the permeate sheet 20. A knife or coating zone 66 on each body half 62 also has a pattern corresponding to the permeate sheet 20 but with a clearance appropriate to apply a coating of dope of a desired thickness on the permeate sheet 20. By metering the dope through outlets 68 on both sides of the casting device 60, with equal pressure on both sides of the permeate sheet 20, the permeate sheet is not pushed towards one side of the vertical slot and an even coating of dope is applied to both sides of the permeate sheet 20. The permeate sheet 20 is loaded into the casting device 60 in a vertical fashion and attached by a clamp 74 onto a drive bar 76. On demand, a dope valve 72 opens, the pump is turned on and the permeate sheet 20 is pulled through the casting device 60 via the drive bar 76 and lowered through an air gap and then into a quench or coagulation tank (not shown) at a pre-set rate of speed. The tank can be heated or cooled as required. Once the permeate sheet 20 is fully coated, the pump is shut off and the dope valve 72 closes.

The clamp 74 is later released and the coated permeate sheet 20 is removed from the tank. The drive bar 76 returns to the casting device 60 ready for the process to be repeated with the next permeate sheet 20.

The casting device 60 offers some advantages. Firstly, the guide portion 64 upstream of the knife 66 helps center the permeate sheet 20 both between the two body halves 62 and by centering the depressions 6 of the permeate sheet 20 within corresponding grooves of the knife 66. Secondly, supplying dope, particularly by metering pump, simultaneously to both sides of a substrate sheet 20 helps in keeping the substrate sheet 20 centered between the body halves 62 so that the dope is applied with the same thickness on both sides of the permeate sheet 20. Thirdly, the draw bar 76 is moved by a controlled driver such that the permeate sheet 20 moves through the casting device 60 at a known reproducible constant speed and enters the tank after a controlled air gap exposure time that can be determined based on the known speed and the elevation of the surface of the liquid in the tank, which is adjustable.

FIG. 19 shows another type of mold that may be used instead of the mold 10 to form a sheet 7. The mold of FIG. 19 is in the form of a roll forming machine 80 comprising an upper roller 82 and the lower platen 84, alternatively called a forming table.

The roller 82 comprises a shaft 86 and a metal cylinder 88 with an embossed surface having a series of angularly spaced teeth or protrusions extending from end to end across the face of the cylinder 88. The ends of the shaft 86 protrude from the ends of the cylinder 88. Heat can be applied to the cylinder 88 via hot oil, electric elements, or induction. The heat is typically maintained at a set temperature during the forming process. The ends of the shaft 86 ride on two linear rails near the sides of the platen 84 which guide the roller 82 over a sheet 7 during the forming process and also set and control the gap between the roller 82 and the platen 84. The roller 82 is moved by sliding the ends of the shaft 86 along the rails. The gap is set such that protrusions on the roller 82 force the sheet 7 into grooves in the platen 84. The platen 84 is engraved generally as described for bottom cavity 9 of mold 10.

The platen 84 is a fixed plate which is generally a negative of the roller 82. The platen 84 can be heated or cooled by recirculating water or oil. Cooling the sheet 7 after the roller 82 passes over it allows for a shorter cycle time. The platen 84 is hollow with several holes 88 travelling from a vacuum chamber 90 through to the engraved surface of the platen 84.

The sheet 7 of material to be formed is placed on the platen 84 between the rails. A vacuum source is initiated, drawing vacuum through the chamber 90 in the platen 84, effectively vacuum clamping the sheet 7 to the platen 84.

The die forming process is then initiated with the roller 82 travelling across the platen 84. The relative movement of the roller 82 and platen 84 may be synchronized through mechanical coupling or electronic gearing to ensure the positive alignment between the embossed surface on the roller 82 and the engraved surface of the platen 84. Heat transferred to the sheet 7 heats the sheet 7 to a temperature that allows the sheet 7 to take the shape of the engraved surface of the platen 84. The roller 82 will continue across the platen 82 until a fully formed sheet 7 is formed. Sheets 7 can be formed bi-directionally with the roller 82 rolling back across the sheet 7 to its start position. The sheet cools to a dimensionally stable temperature while the applied vacuum holds the sheet 7 against the engraved surface of the platen 84.

The use of a die comprising a moving roller 82 and a fixed platen 84 offers some advantages. The flat platen 84 allows the connectors 5 in the sheet 7 to be flat and in a single plane, which would not be possible to the same precision using two rollers. However, having a roller reduces the total thermal mass of the die and results in less stretching of material in the sheet 7 compared to the mold 10 of FIG. 4. The vacuum avoids having to heat and cool an upper mold 4 as described in FIG. 4, which reduces the energy consumption and cycle time of the forming process.

U.S. provisional patent application No. 61/325,972 is incorporated herein by this reference to it.

We claim:

1. A process for coating a permeate sheet having protrusions formed on the permeate sheet, the process comprising the steps of,
    a) locating the permeate sheet relative to a coating knife, the coating knife having a pattern corresponding to the permeate sheet;
    b) providing generally equal amounts of a dope simultaneously to both sides of the permeate sheet; and,
    c) drawing the permeate sheet through the coating knife at a controlled speed.

2. The process of claim 1 wherein the permeate sheet is drawn through the coating knife at a generally constant speed and the flow of dope is at a generally constant rate.

3. The process of claim 2 wherein the permeate sheet is drawn from the coating knife through an air gap to a bath and the length of the air gap is selected to give a desired residence time at the constant speed.

4. The process of claim 1 comprising forming two embossed sheets and bonding the embossed sheets together to form the permeate sheet.

5. The process of claim 4 wherein the embossed sheets are sheets of non-woven fabric.

6. The process of claim 4 wherein the embossed sheets are formed by a process including heating them to above a heat deflection temperature of the embossed sheets.

7. The process of claim 1 comprising passing the permeate sheet through a coating device, wherein the coating device defines a slot adapted to receive the permeate sheet, the coating device comprising a guide section configured to engage the protrusions, one or more dope outlets and the coating knife.

8. The process of claim 7 wherein the coating device comprises two dope outlets and a metering system adapted to feed dope through the dope outlets to both sides of the substrate at an equal pressure.

9. The process of claim 8 wherein the one or more dope outlets are located between the guide section and the coating knife.

10. The process of claim 7 wherein the coating device comprises a metering system adapted to supply dope to the one or more dope outlets at a controlled rate.

11. The process of claim 7 wherein the coating device comprises a drive bar adapted to pull a substrate through the coating device at a selected speed.

12. The process of claim 7 wherein the coating device comprises a dope pump separated from the one or more dope outlets by a valve.

13. The process of claim 7 wherein the coating device comprises a controller adapted to
    a) generally simultaneously start a flow of dope and movement of the membrane substrate at a selected rate through the coating knife; and,
    b) stop the flow of dope before the membrane substrate leaves the coating device.

* * * * *